United States Patent

[11] 3,624,473

[72] Inventor Samuel B. Robbins
Rochester, Mich.
[21] Appl. No. 40,315
[22] Filed May 25, 1970
[45] Patented Nov. 30, 1971
[73] Assignee General Motors Corporation
Detroit, Mich.

[54] CONTROL CIRCUIT FOR POWER WINDOW REGULATOR
6 Claims, 1 Drawing Fig.

[52] U.S. Cl.................................................. 318/266,
318/297, 318/466
[51] Int. Cl................................................... H02p 1/22
[50] Field of Search....................................... 318/266,
466, 297; 317/49

[56] References Cited
UNITED STATES PATENTS
3,332,007 7/1967 Livengood et al. ............ 318/447
3,513,374 5/1970 Koment......................... 318/266

Primary Examiner—Benjamin Dobeck
Assistant Examiner—K. L. Crosson
Attorneys—J. L. Carpenter and Paul Fitzpatrick ABSTRACT: Apparatus for opening and closing a window in accordance with a manually operated switch. A reversible electric motor having first and second field windings and an armature drivably connected to the window opens the window upon placement of the switch in a window-opening setting, which causes energization of the first winding. When the switch is placed in a window-closing setting the second winding is energized and the motor closes the window. Should the motor stall when closing the window due to the window encountering an obstacle the resulting decrease in the armature voltage below a certain level causes a voltage-sensing network and a current-directing network to deenergize the second winding and energize the first winding, thereby opening the window until the switch is removed from the window-closing setting or the window is fully opened.

A time delay network is provided to prevent the voltage-sensing network from monitoring the armature voltage for a predetermined time after the switch is placed in the window-closing position so as to preclude voltage transients caused by starting the motor from effecting reversal of the motor during the predetermined time.

A limit switch is positioned so as to be responsive to the window position and prevents the current-directing network from reversing the window travel when the window is substantially closed so as to allow the motor to stall when sealing the window closed.

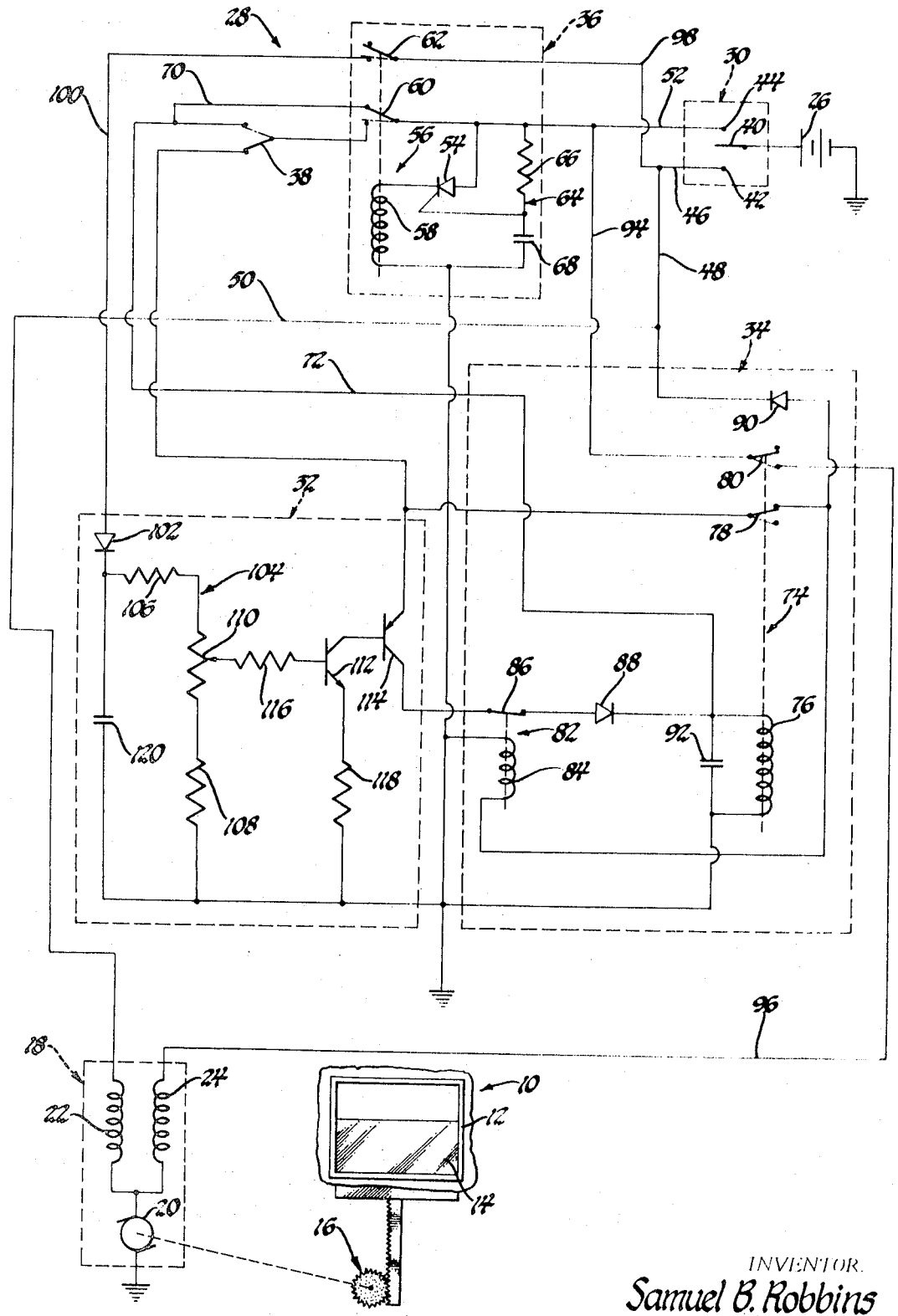
PATENTED NOV 30 1971     3,624,473
INVENTOR.
Samuel B. Robbins
BY
Paul Fitzpatrick
ATTORNEY

CONTROL CIRCUIT FOR POWER WINDOW REGULATOR

This invention relates to power windows and, more specifically, to control circuits for controlling the operation of power windows.

Power windows are in common usage today and are of many types which differ widely, especially in their mechanical drive linkages. However, these devices are generally related to their operation in that they usually are driven by reversible electric motors which are operated by a control circuit in accordance with the setting of a manually operated switch. Though the control circuits employed in conjunction with these devices also are of many types their basic functions are few as all control circuits provide for the opening and the closing of a window and, in some cases, also provide for automatic reversal of the window when it encounters a foreign obstruction while closing.

The subject invention provides all of the foregoing features by monitoring the armature voltage of a window-operating motor having first and second field windings selectively energizable for respectively opening and closing a window and by reversing the motor operation through redirecting current from the second winding to the first winding when the window is being closed and an obstruction has stalled the motor sufficiently for its armature voltage to fall below a certain level. In addition, the subject invention provides for preventing the motor from being reversed for a predetermined time after the second field winding is energized so as to prevent starting voltage transients of the motor from affecting the operation of the window. The subject invention further provides for tightly sealing the window in its closed position by allowing the motor to stall and its armature voltage to fall below the certain level without reversal of the motor by the control circuit.

These and other advantages of the subject invention will be apparent from the following description and accompanying drawing, which is a schematic diagram illustrating power window apparatus incorporating the principles of the subject invention.

Referring now to the drawing, a window assembly 10 which may be part of a motor vehicle, is illustrated by way of example and without limitation as being operated in accordance with the principles of the subject invention. The window assembly 10 includes a window frame 12, a window 14, and a gear and rack assembly 16 drivably connected to the window 14 for opening and closing the window 14 in a well-known fashion. Since the window assembly 10 may take several forms, as is readily apparent to persons versed in the art, and is not itself a part of the present invention it needs no further description.

The window assembly 10 is drivably connected to a motor 18 through suitable apparatus (not shown) so as to enable the motor 18 to operate the window 14. The motor 18 includes an armature 20 drivably connected to the window assembly 10 and first and second field windings 22 and 24 that are selectively energized to rotate the armature 20 so as to operate the window 14. In the illustrated embodiment energization of the first winding 22 effects opening of the window 14 and energization of the second winding 24 causes the armature 20 to close the window 14. Each of the windings 22 and 24 are energized by a suitable power source, such as vehicle battery 26, in accordance with the operation of a control circuit generally indicated at 28.

As is seen in the drawing, the control circuit 28 is comprised of a manually operable switch 30 having window opening and window closing settings which may be selected by a vehicle occupant for opening and closing the window 14, a voltage-sensing network 32 for sensing the armature 20 voltage, a current directing network 34 that is responsive to a signal from the voltage-sensing network 32 and the setting of the switch 30 for controlling the energization of the first and second windings 22 and 24 so as to control the window 14 travel, a time delay network 36 for preventing the voltage-sensing network 32 from monitoring the armature 20 voltage for a predetermined time after the switch 30 is placed in the window-closing setting so as to prevent voltage transients generated by the starting of the motor 18 from affecting the motor 18 operation and a limit switch 38 responsive to the window 14 position for preventing reversal of the window 14 travel when the window 14 is substantially closed so as to allow the motor 18 to stall when it tightly seals the window 14 closed.

Various types of switches may operate satisfactorily as the switch 30 but in the illustrated embodiment the switch 30 is of the well-known type having a switch arm 40 which is normally spring biased to a center, or neutral, position as illustrated and which may be manually deflected to a window-opening setting in which it engages a contact 42 or a window-closing setting in which it engages a contact 44. When the switch arm 40 is placed in the window-opening setting it effects energization of the first winding 22 by completing a circuit through the battery 26, the switch 22, leads 46, 48, and 50, the first winding 22, and the armature 20. When the first winding 22 is energized the armature 20 is driven so as to open the window 14.

To close the window 14 the switch arm 40 is placed in the window-closing setting so as to energize the second winding 24. As the switch 30 is placed in the window-closing setting a current path is completed from the battery 26 through a lead 52 to the time delay network 36, which is comprised of a silicon control rectifier (SCR) 54 which controls a time delay relay 56 that includes a time delay relay coil 58 and contact sets 60 and 62 that are movable from their normal positions, illustrated in solid lines, to their operative positions, illustrated in dashed lines, when the relay coil 58 is energized. The time delay network 36 also includes a timing branch 64 having a resistor 66 and a charging capacitor 68 which controls the triggering of the SCR 54. Since the relay coil 58 is initially deenergized placement of the switch 30 in the window-closing setting connects the battery 26 to the current-directing network 34 both through the leads 46 and 48 and through the lead 52, the contacts 60, and leads 70 and 72.

The current-directing network 34 includes a current-directing relay 74 having a current-directing relay coil 76 and contacts 78 and 80 that are movable from their illustrated solid line positions to their illustrated dashed line positions when the current-directing relay coil 76 is energized. The current directing network also includes a holding relay 82 having a holding relay coil 84 and a set of normally closed contacts 86 that are opened when the holding relay coil 84 is energized, a pair of current-steering diodes 88 and 90, and a filter capacitor 92 in parallel with the current-directing relay coil 76 to render the current-directing relay coil 76 insensitive to current transients. When the switch 30 is placed in the window-closing setting and the battery 26 potential is applied to the current-directing network 34 through the lead 72 the current-directing relay coil 76 is energized, opening the normally closed contacts 78 and closing the normally open contacts 80. When the contacts 78 are opened they preclude the energization of the holding relay coil 84, for reasons which will later become apparent, while closure of the contacts 80 energizes the second winding 24 by completing a current path from the battery 26 to the second winding 24 through the switch 30, the lead 52, a lead 94, the contacts 80, and a lead 96. Accordingly, upon placement of the switch 30 in the window-closing setting the window 14 is moved toward its closed position.

While the window 14 is being closed the capacitor 68 is being charged through the resistor 66 until, at a predetermined time after the switch 30 is placed in the window-closing setting, the charge on the capacitor 68 turns on the SCR 54, energizing the time delay relay coil 58 so as to change the positions of the contacts 60 and 62. Since the first winding 72 is not energized at this time closure of the contacts 62 provides for the sensing of the voltage across the armature 20 by the voltage-directing network 32 through a current path which includes the first winding 22, the leads 50 and 48, a lead 98, the contacts 62, and a lead 100.

The voltage-sensing network 32 controls the operation of the current-directing relay coil 76 in accordance with the sensed armature 20 voltage and includes a current-steering diode 102 for preventing current feedback from the voltage-sensing network 32 and a voltage divider 104 which includes a pair of resistors 106 and 108 and a potentiometer 110 for adjusting the sensitivity of the voltage-sensing network 32 to the armature 20 voltage. The voltage-sensing network 32 also includes a pair of transistors 112 and 114 and appropriate biasing resistors 116 and 118 for detecting when the armature 20 voltage has fallen below a certain level, and a filter capacitor 120 for preventing voltage transients from being passed through the voltage divider 104 to the transistors 112 and 114.

The operation of the control circuit 28 will now be explained in detail. When it is desired to open the window 14 the switch arm 40 of the switch 30 is placed in the window-opening setting so as to engage the contact 42 and cause the energization of the first field winding 22 through the leads 48 and 50. Since the battery 26 is directly connected to the first field winding 22 when the switch 30 is in the window-opening setting the window 14 will be opened until either it reaches its fully opened position and the motor 18 is stalled or the setting of the switch 30 is changed.

When it is desired to close the window 14 after it has been opened the switch 30 is placed in the window-closing setting so as to engage the contact 44 with the switch arm 40 and provide for the initial energization of the second field winding 24 by energizing the current-directing relay coil 76 through the contacts 60 and the leads 70 and 72. Upon energization of the current-directing relay coil 76 the second winding 24 becomes energized through the lead 94, the contacts 80, and the lead 96, thus causing the window 14 to begin to close.

At a predetermined time after the placement of the switch 30 in the window-closing setting, the time being sufficient for the motor 10 to reach steady-state operation and being determinable by proper selection of the resistor 66 and the capacitor 68, the charge on the capacitor 68 turns on the SCR 54. When the SCR 54 is turned on it conducts sufficient current to energize the time delay relay coil 58. Since the SCR 54 is directly connected to the battery 26 through the switch 30 and the time delay relay coil 58 is grounded the SCR 54 keeps the time delay relay coil 58 energized so long as the switch 30 is held in the window-closing setting.

Upon energization of the time delay relay coil 58 the contacts 62 are closed so as to enable the voltage-sensing network 32 to monitor the armature 20 voltage as previously explained. In addition, energization of the time delay relay coil 58 also changes the setting of the contacts 60 so as to discontinue energization of the current-directing relay coil 76 through the leads 70 and 72 and to complete a current path through the normally closed limit switch 38 to the transistor 114. Since the motor 10 has reached steady-state operation and the armature 20 voltage is being sensed by the voltage-sensing network 32 the voltage applied through the voltage divider 104 to the base of the transistor 112 is sufficiently large to turn on the transistors 112 and 114. Accordingly, when the time delay relay coil 58 changes the setting of the contacts 60 the current-directing relay coil 76 is energized through the transistor 114, the contacts 86, and the diode 88. While a discrete time is required for changing the position of the contacts 60, and hence the energizing paths to the current-directing relay coil 76, the capacitor 92 is selected to have sufficient charge storage capability to keep the current-directing relay coil 76 energized until the transistor 114 is turned on.

Should the window 14 encounter an obstacle while being closed the motor 18 will be stalled, decreasing the voltage across the armature 20. When the armature 20 voltage decreases below a certain level the voltage applied to the base of the transistor 112 is insufficient to keep the transistor 112 conductive, causing the transistors 112 and 114 to be turned off. When the transistor 114 is turned off the capacitor 92 is discharged through the current-directing relay coil 76. Should the transistor 114 remain nonconductive for longer than a certain time determined by the charge stored on the capacitor 92 the current-directing relay coil 76 becomes deenergized and returns the contacts 78 and 80 to their original positions illustrated in solid lines. The return of the contacts 80 to their solid line position opens the current path through the lead 96 to the second field winding 24 so as to discontinue closure of the window 14 while the return of the contacts 78 to their solid line position effects reversal of the motor 18 so as to open the window 14 until the switch 30 is changed from the window-closing setting or the window 14 is fully opened. This is achieved by the contacts 78 connecting the emitter of the transistor 114, which is at the potential of the battery 26, to the first winding 22 through the diode 70 and the lead 50 so as to energize the first winding 22 and open the window 14. In addition, closure of the contacts 78 connects the emitter of the transistor 114 to the holding relay coil 84, energizing the holding relay coil 84 so as to open the contacts 86. The opened contacts 66 thus preclude the current-directing relay coil 76 from becoming energized, assuring that the first winding 22 will remain energized so long as the switch 30 is held in the window-closing setting regardless of the voltage across the armature 20. The first field winding 22 of the motor 18 thus remains energized through the contacts 78 of the current-directing relay 74 so long as the switch arm 40 is held in the window-closing setting. When the operator releases the switch arm 40 it returns to the illustrated neutral position, discontinuing the supply of power from the battery 26 to the control circuit 28 so as to permit subsequent operation as previously described.

While the encountering of an obstacle by the window 14 prior its reaching its fully closed position causes automatic reversal of the motor 18 so as to open the window 14, the control circuit 28 provides for tightly sealing the window 14 closed. This is achieved by positioning the limit switch 38 so as to be responsive to the window 14 position. Accordingly, when the window 14 is substantially in its closed position it changes the setting of the limit switch 38 from the illustrated solid line position to the position shown in dashed lines, which causes the energization of the current-directing relay coil 76 through the lead 72 whenever the switch 30 is in the window-closing setting regardless of whether the time delay relay coil 58 is energized. The contacts 80 are thus held closed by the current-directing relay coil 76 so as to provide continuous energization of the second field winding 24 through the lead 96, which enables the motor 18 to stall while closing the window 14. Since the torque of the motor 18 is at a very high level when the motor 18 is stalled a tight seal of the window 14 is assured.

It is thus apparent that I have devised new and useful apparatus for operating a power window under a variety of operating conditions, though persons versed in the art will perceive that various modifications may be made to this apparatus without departing from the spirit of my invention.

I claim:

1. Apparatus for moving a window between opened and closed positions comprising, in combination, a power source, a reversible electric motor drivably connected to the window, the motor having an armature and being operable in first and second energized conditions effective to open and close the window, and means for connecting the power source to the motor effective to operate the window, the means including switch means having at least window opening and window closing settings, the switch means being operative in the window-opening setting to effect energization of the motor in the first energized condition by connecting the power source in series circuit therewith so as to open the window, voltage-sensing means for monitoring the armature voltage of the motor, current-directing means responsive to the switch position and the voltage-sensing means both for completing a first circuit through the power source and the motor when the switch means is in the window-closing setting and the monitored armature voltage is above a certain level effective to place the motor in the second energized condition and for opening the first circuit and completing a second circuit through the power source and the motor when the switch means is in the window-closing setting and the monitored armature voltage has fallen below the certain level effective to place the motor in the first energized condition so as to reverse the motor and open the window, and means for preventing the voltage-sensing means from monitoring the armature voltage for a predetermined time after the switch means is placed in the window-closing setting so as to prevent voltage transients caused by starting the motor from effecting reversal of the motor during the predetermined time.

2. Apparatus for moving a window between opened and closed positions comprising, in combination, a power source, a reversible electric motor having an armature and being operable in first and second energized conditions drivably coupled to the window effective to open and close the window, and means for connecting the power source to the motor effective to operate the window, the means including switch means having at least window opening and window-closing settings, the switch means being operative in the window-opening setting to place the motor in the first energized condition by connecting the power source in series circuit therewith so as to open the window, voltage-sensing means for monitoring the armature voltage of the motor, current-directing means responsive to the switch position and the voltage sensing means for completing a first circuit through the power source and the motor when the switch means is in the window-closing setting and the monitored armature voltage is above a certain level so as to place the motor in the second energized condition and for opening the first circuit and completing a second circuit through the power source and the motor when the switch means is in the window-closing setting and the monitored armature voltage has fallen below the certain level so as to place the motor in the first energized condition, thereby effecting reversal of the motor and opening the window, means for preventing the voltage-sensing means from monitoring the armature voltage for a predetermined time after placement of the switch means in the window-closing setting so as to prevent transient voltages caused by starting the motor from effecting reversal of the motor during the predetermined time, and means responsive to the window position for preventing the voltage-sensing means from affecting the current-directing means when the window is substantially closed whereby the motor is allowed to stall and the armature voltage is permitted to fall below the certain level so as to tightly seal the window closed.

3. Apparatus for opening and closing a window comprising, in combination, a reversible motor having first and second selectively energizable field windings and an armature drivably coupled to the window for opening and closing the window in accordance with the energization of the first and second windings, a power source, a switch having at least window opening and window closing settings, means for effecting energization of the first winding by the power source when the switch is in the window-opening setting, means for energizing the second winding with the power source when the switch is placed in the window-closing setting, sensing means for monitoring the armature voltage, means responsive to the sensing means and the switch setting for effecting reversal of the motor by deenergizing the second winding and energizing the first winding when the switch is in the window-closing setting and monitored armature voltage has fallen below a certain level so as to open the window until the switch is removed from the window-closing setting or the window is fully opened, and means for precluding the sensing means from monitoring the armature voltage for a predetermined time after the switch is placed in the window-closing setting so as to prevent voltage transients generated upon stating the motor from effecting reversal of the motor during the predetermined time.

4. Apparatus for opening and closing a window comprising, in combination, a reversible motor having an armature drivably coupled to the window for opening and closing the window and first and second field windings selectively energizable effective to open and close the window, a power source, a switch having at least window opening and window closing settings, means for effecting energization of the first winding by the power source when the switch is in the window-opening setting, means for energizing the second winding with the power source when the switch is placed in the window-closing setting, sensing means for monitoring the armature voltage, means responsive to the sensing means and the switch setting for effecting reversal of the motor by deenergizing the second winding and energizing the first winding when the switch is in the window-closing setting and the monitored armature voltage has fallen below a certain level so as to open the window until the switch is removed from the window-closing setting or the window is fully opened, means for precluding the sensing means from monitoring the armature voltage for a predetermined time after the switch is placed in the window-closing setting so as to prevent voltage transients generated upon starting the motor from effecting reversal of the motor during the predetermined time, and means responsive to the window position for preventing the voltage-sensing means from effecting reversal of the motor when the window is substantially closed so as to permit the armature voltage to fall below the certain level and the motor to stall when the motor seals the window closed.

5. Apparatus for opening and closing a window comprising, in combination, a power source, a reversible electric motor having first and second selectively energizable field windings and an armature drivably connected to the window for opening and closing the window in accordance with the energization of the first and second windings, a manually operable switch including at least window opening and window closing settings, the switch being effective in the window-opening setting to connect the power source and the first winding in series circuit so as to energize the first winding and effect opening of the window, voltage-sensing means for monitoring the armature voltage of the motor, current-directing means responsive to the switch setting and the voltage-sensing means for connecting the second winding in series circuit with the power source so as to energize the second winding so long as the switch is in the window-closing setting and the armature voltage remains above a certain level and for connecting the first winding in series circuit with the power source so as to energize the first winding so long as the switch is in the window-closing setting and after the armature voltage has fallen below the certain level, placement of the switch in the window-closing setting thereby effecting closure of the window until the armature voltage falls below in the certain level and opening of the window after the armature voltage has fallen below the certain level, time delay means for preventing the voltage-sensing means from affecting the operation of the current-directing means for a predetermined time after the switch is placed in the window-closing setting so as to prevent the motor from opening the window during the predetermined time, and window position responsive means for preventing the voltage-sensing means from affecting the operation of the current-directing means when the window is substantially closed whereby the motor is allowed to stall and the armature voltage is allowed to fall below the certain level so as to enable the motor to tightly seal the window closed.

6. Power window apparatus for opening and closing a window comprising, in combination, a power source, a reversible electric motor including first and second selectively energizable field windings and an armature drivably connected to the window so as to open and close the window in accordance with the energization of the windings, a selectively operable switch having at least window opening and window closing settings for selectively energizing the first and second windings, the switch being operative in the window-opening setting to effect energization of the first winding by the power source so as to open the window, a voltage-sensing network for monitoring the armature voltage, the voltage-sensing network including a switch responsive to the voltage across the armature for detecting when the armature voltage is below a certain level, a current-directing network including a current-directing relay responsive to the switch in the voltage-sensing network and the setting of the selectively operable switch, the relay having a first operative condition when the selectively operable switch is in the window-closing setting and the monitored armature voltage is above the certain level effective to energize the second winding with the power source so as to close the window and a second operative condition when the selectively operable switch is in the window-closing setting and the monitored armatured voltage has fallen below the certain level effective to cause energization of the first winding with the power source so as to open the window and means effective to maintain the relay in said second operative condition so as to continue the opening of the window until the selectively operable switch is removed from the window-closing setting or the window is fully opened, a time delay network including a relay operative in a first condition to preclude the voltage-sensing network from monitoring the voltage across the armature and the operative in a second condition to permit the voltage-sensing network to monitor the voltage across the armature and means for maintaining the relay in the first condition until the selectively operable switch has been in the window-closing setting for a predetermined time, thereby preventing voltage transients caused by starting the motor from affecting the operation of the current-directing network during the predetermined time, and switch means responsive to the window position for keeping the current-directing relay in its first operative condition when the window is substantially closed and the switch is in the window-closing setting, thereby preventing the voltage-sensing network from placing the current-directing relay in its second operative condition whereby the voltage across the armature is allowed to fall below the certain level while the motor stalls as it seals the window closed.

* * * * *